United States Patent
Roskind et al.

(10) Patent No.: US 9,515,888 B2
(45) Date of Patent: *Dec. 6, 2016

(54) WIRELESS LOCAL AREA NETWORK GATEWAY CONFIGURATION

(71) Applicant: Google Inc., Mountain View, CA (US)

(72) Inventors: James Roskind, Redwood City, CA (US); Hal Bailey, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,898

(22) Filed: Sep. 11, 2015

(65) Prior Publication Data

US 2015/0381427 A1    Dec. 31, 2015

Related U.S. Application Data

(63) Continuation of application No. 13/461,295, filed on May 1, 2012, now Pat. No. 9,143,400.

(51) Int. Cl.
*H04L 12/24* (2006.01)
*H04L 12/46* (2006.01)
*H04L 29/12* (2006.01)
*H04W 12/06* (2009.01)
*H04W 84/12* (2009.01)
*H04W 88/16* (2009.01)
*H04L 29/06* (2006.01)

(52) U.S. Cl.
CPC ....... *H04L 41/0896* (2013.01); *H04L 12/4633* (2013.01); *H04L 41/08* (2013.01); *H04L 41/0806* (2013.01); *H04L 61/2007* (2013.01); *H04W 12/06* (2013.01); *H04L 63/0407* (2013.01); *H04L 63/0823* (2013.01); *H04W 84/12* (2013.01); *H04W 88/16* (2013.01)

(58) Field of Classification Search
CPC ............... H04L 41/0896; H04L 41/08; H04L 41/0806; H04L 12/4633; H04L 61/2007; H04L 63/0407; H04L 63/0823; H04W 12/06; H04W 84/12; H04W 88/16
USPC ........................................................ 709/221
See application file for complete search history.

(56) References Cited

U.S. PATENT DOCUMENTS

| | | |
|---|---|---|
| 7,617,317 B2 | 11/2009 | Jones et al. |
| 7,734,283 B2 | 6/2010 | Sebban |
| 7,899,019 B1 | 3/2011 | Evans et al. |
| 7,924,780 B2 | 4/2011 | Waisman-Diamond |

(Continued)

*Primary Examiner* — Viet Vu
(74) *Attorney, Agent, or Firm* — McDermott Will & Emery LLP

(57) ABSTRACT

Methods, systems, and computer program products for configuring wireless local area network gateways to provide visitors with network access, are provided. A nearby client device of a user is provided a first level of access through the wireless local area network gateway to access a cloud-based service provider in a remote network. A determination is made whether a source Internet Protocol (IP) address associated with a request for authentication received from the nearby client device is matched to a public IP address of the wireless local area network gateway. If a match is determined, a configuration setting associated with the nearby client device of the user is received from the cloud-based service provider and the wireless local area network is reconfigured to provide a second level of access to the nearby client device of the user. Corresponding system and computer readable mediums are also provided.

19 Claims, 7 Drawing Sheets

(56) References Cited

U.S. PATENT DOCUMENTS

| | | |
|---|---|---|
| 8,190,757 B1 | 5/2012 | Davis et al. |
| 8,472,371 B1 | 6/2013 | Bari et al. |
| 8,478,233 B2 | 7/2013 | Liu et al. |
| 8,887,289 B1 | 11/2014 | Hullale |
| 2003/0050976 A1 | 3/2003 | Block et al. |
| 2004/0152463 A1 | 8/2004 | Grootwassink |
| 2005/0059396 A1 | 3/2005 | Chuah et al. |
| 2006/0161771 A1 | 7/2006 | Zhang |
| 2006/0262752 A1 | 11/2006 | Moore et al. |
| 2007/0226499 A1 | 9/2007 | Zhang |
| 2008/0232272 A1* | 9/2008 | Gelbman .......... H04L 29/12028 370/254 |
| 2009/0125521 A1 | 5/2009 | Petty |
| 2009/0323636 A1 | 12/2009 | Dillon et al. |
| 2010/0062791 A1* | 3/2010 | Wang .................... H04W 12/12 455/456.1 |
| 2011/0019607 A1 | 1/2011 | Beck et al. |
| 2011/0154447 A1 | 6/2011 | Dennis et al. |
| 2011/0167478 A1 | 7/2011 | Krishnaswamy et al. |
| 2012/0110643 A1 | 5/2012 | Schmidt et al. |
| 2012/0240197 A1 | 9/2012 | Tran et al. |
| 2012/0311691 A1 | 12/2012 | Karlin et al. |
| 2013/0117806 A1 | 5/2013 | Parthasarathy et al. |

* cited by examiner

WIRELESS LOCAL AREA NETWORK GATEWAY CONFIGURATION

CROSS-REFERENCE TO RELATED APPLICATIONS

The present application is a continuation of U.S. patent application Ser. No. 13/461,295 entitled "NETWORK GATEWAY CONFIGURATION," filed on May 1, 2012, issued as U.S. Pat. No. 9,143,400 on Sep. 22, 2015, which is hereby incorporated by reference in its entirety for all purposes.

TECHNICAL FIELD

This disclosure relates generally to providing network access through home network devices.

BACKGROUND

Home-based network gateways, such as home wireless routers, are widely installed by users in order to have the flexibility of being able to wirelessly connect one or more devices to the home network and to the internet. A home network gateway creates a wireless network that is accessible throughout or in parts of a home or building. The wireless network coverage areas of a home network gateway may also include an area outside of the building in which the gateway is installed. The owner of the home network gateway may be the homeowner or some other user. The owner of the home network gateway may wirelessly connect various devices, such as, computers, media platforms, storage platforms, printers and the like, to the wireless network. The home network gateway wirelessly interconnects such devices and provides the ability for wirelessly connected devices to access the internet or download and/or stream content from the internet. The owner may also allow access to the local wireless network by other persons, such as family members or visiting friends, who are within the range of the home wireless network. For example, the owner may provide the access password of the home wireless network to visiting friends so that they can access the internet or corporate virtual private network (VPN) through the home network gateway. The connectivity to external networks, such as the internet or corporate VPNs, may be provided by an internet service provider (ISP) with whom the user typically has an agreement to provide internet access.

Often some or all of the network access capacity of the home network gateway remains unused because neither the owner nor any other user authorized by the owner uses the home network gateway at its bandwidth capacity for some duration of time. As more and more home network gateways are installed in the network, the bandwidth capacity that may sit idle may increase. Therefore, methods and systems are desired to better utilize the network access capacity of home network gateways.

SUMMARY

According to the subject technology, a method of configuring a wireless local area network gateway is provided. The method includes providing to a nearby client device of a user a first level of access through the wireless local area network gateway to access a cloud-based service provider in a remote network, wherein the nearby client device of the user is communicatively coupled to the wireless local area network gateway through a local network interface of the wireless local area network gateway. The method also includes determining, by one or more processors, if a source Internet Protocol (IP) address associated with a request for authentication received from the nearby client device is matched to a public IP address of the wireless local area network gateway. The method further includes if the source IP address matches the public IP address, receiving, from a cloud-based configuration provider, a configuration setting associated with the nearby client device of the user and reconfiguring, by one or more processors, the wireless local area network gateway in accordance with the received configuration setting to provide a second level of access to the nearby client device of the user.

According to the subject technology, a wireless local area network gateway is provided. The wireless local area network gateway includes a processor, a downlink network interface communicatively coupled to the processor and configured to access a home network, and an uplink network interface communicatively coupled to the processor and configured to directly or indirectly access a remote network. The wireless local area network gateway also includes a visitor detection module configured to be executed by the processor and to detect an access by a client device of a visitor through the wireless local area network gateway to a cloud-based service. The wireless local area network gateway further includes a configuration receiving module configured to receive a configuration setting associated with the visitor from a cloud-based configuration provider, to determine if a source Internet Protocol (IP) address associated with a request for authentication received from the client device of the visitor is matched to a public IP address of the wireless local area network gateway, and if the source IP address matches the public IP address, to associate the configuration setting with the visitor. The wireless local area network gateway also includes a configuration module configured to be executed by the processor and to configure the wireless local area network gateway in accordance with the received configuration setting to provide a second level of access to the client device of the visitor, wherein the second level of access is configured within an estimated unused service capacity of the wireless local area network gateway.

According to the subject technology, a non-transitory machine readable medium is provided. The non-transitory machine readable medium includes instructions stored therein, which when executed by a system, cause the system to perform operations including providing to a nearby client device of a user a first level of access through the wireless local area network gateway to access a cloud-based service provider in a remote network, wherein the nearby client device of the user is communicatively coupled to the wireless local area network gateway through a local network interface of the wireless local area network gateway. The operations further include determining, by one or more processors, if a source Internet Protocol (IP) address associated with a request for authentication received from the nearby client device is matched to a public IP address of the wireless local area network gateway. If the source IP address matches the public IP address, the operations also include receiving, from a cloud-based configuration provider, a configuration setting associated with the nearby client device of the user and reconfiguring, by one or more processors, the wireless local area network gateway in accordance with the received configuration setting to provide a second level of access to the nearby client device of the user, wherein the second level of access is configured within an estimated unused service capacity of the wireless local area network gateway.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS/FIGURES

Reference will be made to implementations, examples of which may be illustrated in the accompanying figures. These figures are intended to be illustrative, not limiting. Although the invention is generally described in the context of these implementations, it should be understood that it is not intended to limit the scope of the disclosure to these particular implementations.

DETAILED DESCRIPTION

Figure 1:
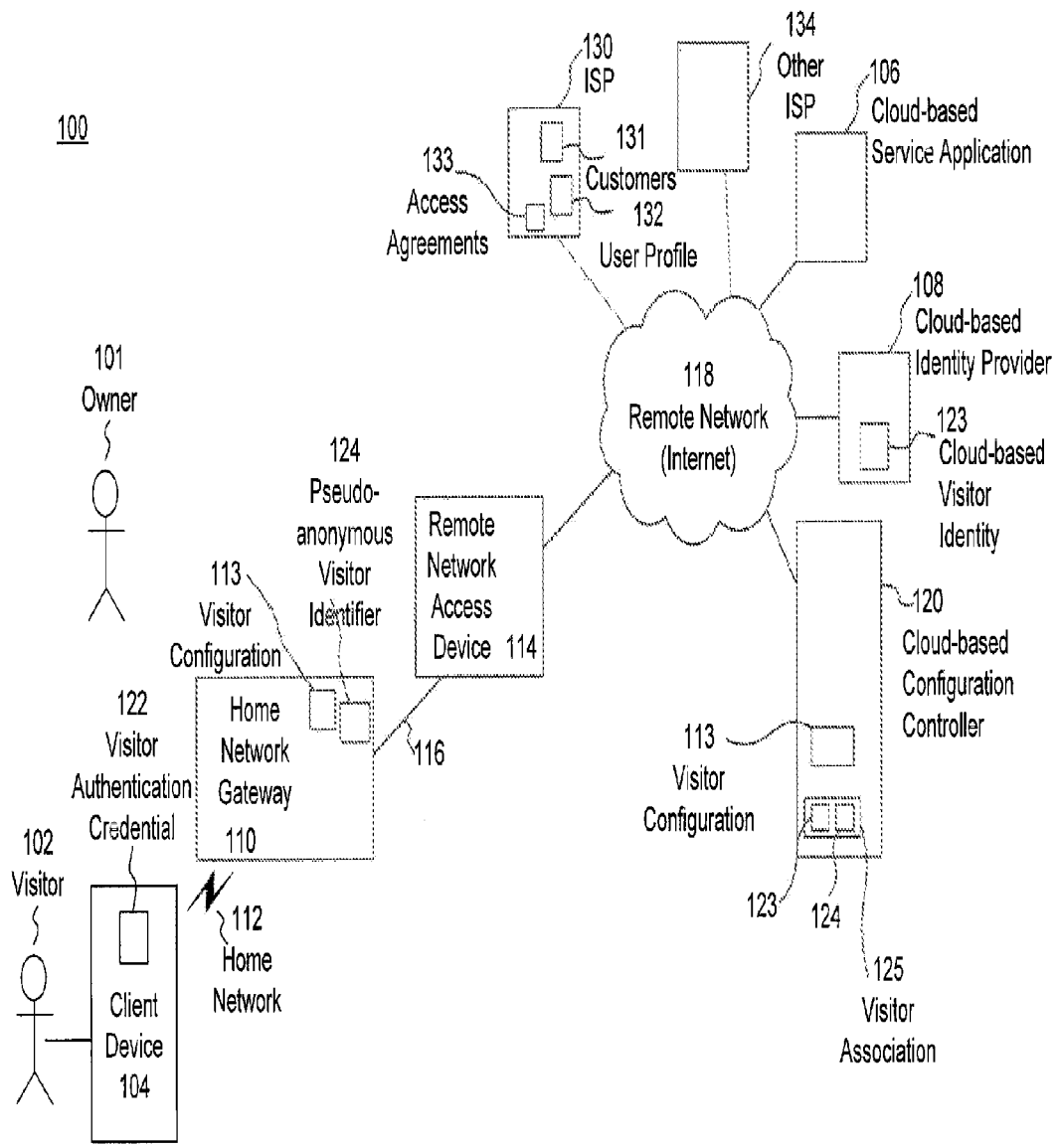
FIG. 1 illustrates a system for cloud-based control of a network device, according to an implementation.

While the disclosure refers to illustrative implementations for particular applications, it should be understood that the disclosure is not limited thereto. Those skilled in the art with access to this disclosure will recognize additional modifications, applications, and implementations within the scope of this disclosure and additional fields in which the disclosed examples could be applied.

Implementations disclosed herein may be used in cloud-based control of a home network gateway in order to utilize the excess bandwidth capacity of the gateway to provide internet access to users other than the owner and other users authorized by the owner. For example, an ISP or other service provider may enter into agreements with the owners of home network gateways to utilize excess service capacity, such as excess bandwidth, of the respective gateways in order to allow access to the network to subscribers of the ISP or other service provider who comes within range of the home network gateway. The network gateway, in this instance, functions similarly to a wireless hotspot (e.g., wireless access point that allows more than one use to simultaneously access the wireless network) that provides network access to the owner, users authorized by the owner, and other users that are known to the owner's ISP or other service provider. The controlled network devices can include, but are not limited to, network gateways such as home network gateways and wireless routers.

Implementations are directed to utilize the service capacity of the home network gateway that is not used by the owner and other users authorized by the owner. According to an implementation, the excess capacity can be utilized in order to improve the network access for ISP customers who use 3G or 4G networks to access the internet. For example, when such a user who uses 3G or 4G to access the internet comes close to a home network gateway configured according to an implementation, the gateway automatically determines whether that user is eligible to receive access to remote networks. According to implementations, the determination is based upon factors including a cloud-based authenticated identity of the user and the user's relationship to the ISP or other service provider which provides network access to the owner of the home network gateway.

Each network device, such as, for example, a home network gateway, is associated with an "owner." An authenticated cloud-based identity of a user may be associated with the ownership of a network device in the user's home, and thereby the user is allowed to control the network device using his cloud-based identity. In some implementations, the association of the cloud-based identity of the user with the ownership may be automatic. For example, owner's cloud-based identifier can be automatically discovered and applied to the ownership of a network device. Moreover, by associating a cloud-based identity with the ownership and control of the network device, functions such as reliable authentication of access and delegation of control of the network device are enabled. Methods, systems, and computer program products for cloud-based adaptive ownership of network devices are disclosed in U.S. patent application Ser. No. 13/460,707 titled "Adaptive Ownership and Cloud-based Control of Network Devices" naming James Roskind and Wan-Teh Chang as inventors, which is hereby incorporated by reference in its entirety. The cloud-based identity of the user may be used to represent the owner of the home network gateway. Another application with a common inventor, U.S. patent application Ser. No. 13/402,762 titled "Socially-Aware Cloud-based Control of Network Devices" naming James Roskind as inventor, describes methods, systems and computer program products by which persons that have network-defined social relationships with the owner of the network device can be automatically provided access. U.S. patent application Ser. No. 13/402,762 is hereby incorporated by reference in its entirety.

The term "owner" is used herein to refer to the person or entity that owns the network gateway. The network gateway itself may not be aware of the actual identity of its owner, and may only be aware of an authenticated identity (possibly pseudo-anonymous) generated by a cloud-based identity provider. The owner is provided with authenticated access to that network gateway and is authorized to perform administrative operations. Administrative operations may include configuring network interfaces, configuring access to the network to other users, configuring firewall rules, configuring address assignments, and the like. There may be one or more users, including the owner, who are capable of performing administrative operations on the network device. Such users are referred to herein as "privileged users."

As used herein, a "visitor" or "visiting user" is any use who is not the owner of the network gateway. A visitor, for example, may be a family member of the owner or other person who regularly uses network gateway 110 and home network 112. A visitor may also include any other user who may access network gateway 110 occasionally. For example, some visitors who come within range of the home network gateway may not be known to the owner. U.S. patent application Ser. No. 13/402,762, incorporated by reference above, discloses methods by which some visitors may be provided network access based upon network-defined social relationships with the owner. Network-defined social relationships of the owner may include, for example, other users who are associated with the owner due to their use of the network gateway owned by the owner. Implementations disclosed herein enable the automatic provision of network services to visitors that have a predefined relationship, such as, for example, network-defined social relationships, with the owner's ISP or other service provider.

The term "cloud-based" is used in relation to a service, resource or data item to indicate that the service, resource or data item can be provided by a cloud computing device, such as, but not limited to, one or more servers or other computing resources accessible via one or more networks.

FIG. 1 illustrates a system 100 for cloud-based control of network devices in order to utilize excess service capacity to provide access to nearby users (e.g., users located within the range of a home WIFI or Bluetooth network, and users connected to another type of home local area network), in accordance with an implementation. System 100 comprises a client device 104, cloud based service application 106, cloud-based identity provider 108, a network gateway 110, internet access device 114, and a cloud-based configuration controller 120.

A visiting user 102 ("visitor") accesses a cloud-based service application 106 using client device 104. Client device 104 connects to remote network 118 through a network gateway 110. Client device 104 may initially connect to network gateway 110 before the latter is configured to control access for visitor 102. Cloud-based identity provider 108 authenticates the access by visitor 102 to cloud-based service application 106. System 100 automatically detects the authentication of visitor 102 by cloud-based service application 106 and the resulting determination of a cloud-based visitor identity 123 of visitor 102. System 100, based upon the determined cloud-based visitor identity 123, configures network gateway 110 to control the network access provided to visitor 102. The control of network access may be based upon the relationships of visitor 102 and owner 101 of network gateway 110 with an ISP or other service provider.

Client device 104 can be any computing device (e.g., server, personal computer, laptop computer, netbook computer, tablet computer, personal digital assistant), a smart phone, MP3 player, set top box, or other device using which the visitor can initiate an access to a remote network 118, such as the internet or other wide area network (WAN).

Cloud-based service application 106 can be any application which requires authentication for access. Web-based email provider applications (e.g., GMAIL, YAHOO MAIL) and web-based personal portals (e.g., IGOOGLE, MY YAHOO) are examples of cloud-based service application 106. Cloud-based service application 106 requires that the user is authenticated, for example, by providing a user identifier and a password, in order for the user to be allowed access to the provided service. For example, visitor 102 may use user credentials 122 (e.g., user identifier and password) to log in to a web-based email service. Cloud-based service application 106 may be implemented on one or more servers and connected to remote network 118.

Cloud-based identity provider 108 provides a cloud-based identity for registered users. A user, such as visitor 102, may have a pre-existing cloud-based visitor identity 123 provided by cloud-based identity provider 108. When visitor 102 attempts to access a service, such as a cloud-based service application 106, cloud-based identity provider 108 may authenticate visitor 102 based on user credentials 122 that are provided. When authenticated by cloud-based identity provider 108, logged in visitor 102 is represented within system 100 as cloud-based visitor identity 123. Exemplary cloud-based identity providers include Google, Yahoo, Microsoft, United States Post Office, Credit Card Companies, email service providers, financial institutions and the like that provide identity and authentication of users for many cloud-based applications.

Network gateway 110 provides an interface (not shown) to local network 112 through which clients, such as client device 104, and other user devices, such as networked peripheral devices (not shown) connect to a remote network 118 and/or to each other. Networked peripheral devices can include one or more computers, entertainment platforms, communications platforms, printers, storage devices, household appliances, or other network-connected devices. Local network 112 may include one or more of WIFI, Bluetooth, Ethernet, or other wireless or wireless local area network (LAN). Network gateway 110 may include one or more interfaces (not shown) to local networks such as network 112. Network gateway 110 forwards packets to and from devices on the local networks towards one or more remote networks (e.g., network 118). Network gateway 110 provides a primary point of control of a user's connectivity to networks, such as network 118. In addition to providing local area network connectivity (e.g., wireless access point) and forwarding to packets to/from devices on the local area network 112, network gateway 110 may implement firewalls for intrusion detection and to allow or to deny connections to or from any of the devices (not shown) on local area network 112. Network gateway 110 can also implement capabilities to authorize and/or enable remote access to any of the peripheral devices (not shown) in local network 112.

Network gateway 110 may be directly coupled to the remote network 118 (through a provider network) or it may be indirectly connected via a network link 116 to a separate remote network access device 114 (e.g., digital subscriber line (DSL) modem, cable modem) which in turn connects to remote network 118. Network gateway 110 can include access to remote network 118 through a third or fourth generation (3G or 4G) wireless network.

One or more of the implementations are directed at controlling network gateway 110 through a cloud-based service such as cloud-based configuration controller 120 in order to provide network access to a visitor 102 based upon the excess bandwidth capacity available in the network gateway 110, the cloud-based authenticated identity of visitor 102, and the relationships between the ISP (or other service provider) of owner 101 and visitor 102. Cloud-based configurations controller 120 operates to enable visitor 102 to gain access to and to use devices including network gateway 110. Cloud-based configuration controller 120 can establish an association between a cloud-based identity, such as cloud-based visitor identity 123 of visitor 102 and a visitor identifier 124 configured on network gateway 110. Network gateway 110 can be configured by setting up a pseudo-anonymous identifier as the identifier for the visitor to whom access is to be provided. Visitor identifier 124, for example, may be a pseudo-anonymous identifier which has no relationship, other than an association, such as visitor association 125, maintained by cloud-based configuration controller 120 and to an identity of visitor 102. Subsequently, cloud-based configuration controller 120 enables owner 101 to automatically or manually control and manage network gateway 110 to provide network access to visitor 102 and to enable visitor 102 to access cloud-based service applications, such as service application 106. By using only pseudo-anonymous visitor identifier 124 in the network gateway 110 to identify the configurations related to visitor 102, the real identity of visitor 102 is shielded from network gateway 110. Based on the determinations made by configuration controller 120, a visitor configuration 113 may be created. Visitor configuration 113 includes the configurations to be implemented in network gateway 110 in order to provide visitor 102 with network access. According to an implementation, visitor configuration 113 specifies the maximum bandwidth allowable for visitor 102, so as not to exceed the available excess bandwidth of network gateway 110. According to another implementation, visitor configuration 113 specifies network access capabilities including one or more of bandwidth, applications, or services, to not exceed an estimated unused service capacity of network gateway 110. Visitor configuration 113, or parts thereof, may be downloaded to gateway 110 in order to be implemented.

ISP 130 is reachable from network gateway 110 through remote network 118, and operates to provide internet connectivity to owner 101 through network gateway 110. As noted above, in some implementations, a remote network access device 114 may be an intermediate device between network gateway 110 and remote network 118. Each ISP maintains a database 131 of its customers. For each of its customers, an ISP may maintain a user profile 132 that specifies the desired level of service, subscribed services, and other parameters. For example, profile 132 may also specify whether the user has subscribed to the capability to have wireless hotspot access through the home network gateways of other customers of the user's ISP, and/or whether the user has subscribed to the capability to have wireless hotspot access through the home network gateways of customers of other ISPs.

One or more other ISPs 134 may be reachable from remote network 118. According to an implementation, one of the other ISPs 134 may operate to provide internet service to visitor 102. Other ISPs 134 may provide visitor 102 with access to the internet, for example, when visitor 102 is at his home location and/or at other locations including internet connectivity during roaming. ISPs 130 and 134 may have formed access agreements 133 that enable customers of ISP 134 to obtain wireless hotspot access through home network gateways of customers of ISP 130. Access agreements 133 may, for example, specify the desired service level, subscribed to services, and the like for the respective customer. In determining whether to allow wireless hotspot access to a visitor who belongs to an ISP which is not the owner's ISP, cloud-based configuration controller 120 may consider access agreements 133 between the owner's ISP and the visitor's ISP.

Figure 2:
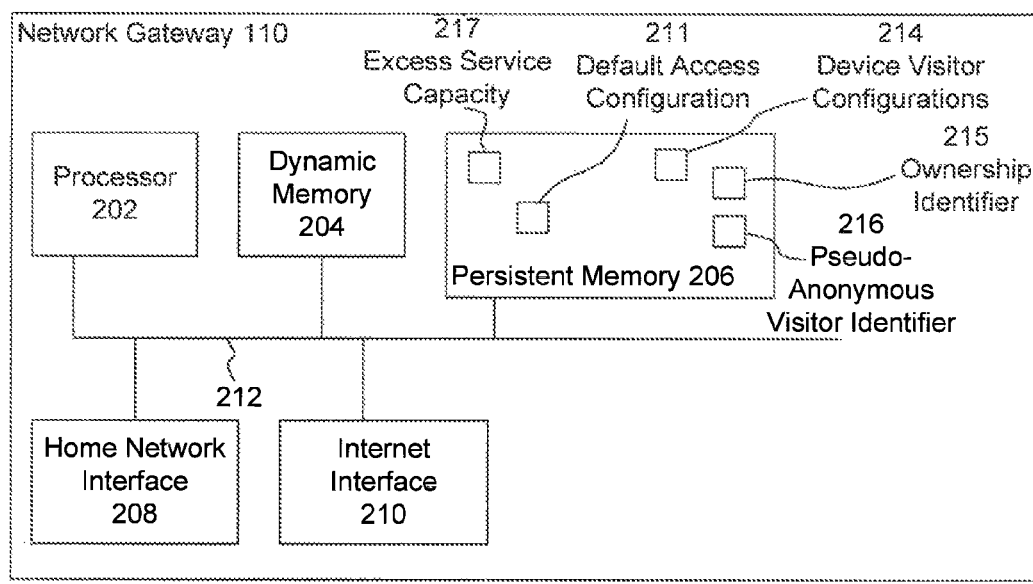
FIG. 2 illustrates a block diagram of a network device in accordance with an implementation.

FIG. 2 illustrates a block diagram of a network gateway device 110 in accordance with an implementation. Network gateway 110 includes a processor 202, a volatile memory 204, a persistent memory 206, one or more local network interfaces (e.g., home network interface) 208, one or more remote network interfaces (e.g., Internet interface) 210, and an interconnection infrastructure 212. Processor 202 can be a processor, such as, but not limited to, a microprocessor, field programmable gate array (FPGA), or digital signal processor (DSP). Volatile memory 204 can include a random access memory (RAM) or like memory. Persistent memory 206 can include a persistent data storage medium such as a hard-disk or flash-memory storage device. Device visitor configurations 214, which include configuration parameters of network gateway 110 regarding access provided to visitors, may be stored in persistent memory 206. Device visitor configurations 214 can include configurations to be implemented in network gateway 110 in order to provide network access to visitor 102. Owner identifier 215 and visitor identifier 216 of network gateway 110 may also be stored in persistent memory 206. According to an implementation, one or both of owner identifier 215 and visitor identifier 216 stored in network gateway 110 can be pseudo-anonymous.

A default access configuration 211 can be configured at network gateway 110 and stored in persistent memory 206. Default access configuration 211 specifies a default level of access to be provided to visitors such as visitor 102. Default access configuration 211 can, for example, include a list of network locations which is an as yet unauthorized user is able to access. According to an implementation, until an authorization for network access is obtained for visitor 102, he is restricted to accessing only the locations listed in default access configuration 211.

An excess or unused service capacity estimate 217 may be dynamically determined by network gateway 110 and may be stored in persistent memory 206 or dynamic memory 204. Excess service capacity estimate 217 is an estimate of the amount of unused capacity available at network gateway 110. According to an implementation, excess service capacity estimate 217 can include an excess bandwidth estimate. According to an implementation, excess bandwidth estimate is the difference between a preconfigured or dynamically determined maximum available bandwidth of network gateway 110 and the actual bandwidth used by owner 101 over a predetermined time interval. According to another implementation, the difference may be determined based upon the actual bandwidth used by the owner 101 and also any other users authorized by owner 101. According to an implementation, the level of service provided for visitor 102 may be limited to and not exceed the estimated excess service capacity 217, so as to ensure that any wireless hotspot facility provided to customers of the ISP do not interfere with the level of service available to owner 101 and other users authorized by owner 101 to access network gateway 110.

Communications infrastructure 212 operates to communicatively couple modules of network device 110. According to an implementation, communications infrastructure comprises at least one communications bus.

Local network interface 208 communicatively couples client devices (such as visitor client device 104 through which visitor 102 access remote network 118), various input/output devices, computing and/or entertainment platforms, and the like, to network gateway 110. For example, visitor client device 104 may be coupled to home network 112 and to through local network interface 208. Network interface 208 can comprise one or more interfaces to wired or wireless networks such as Wi-Fi, Bluetooth, or Ethernet network.

Remote network interface 210 operates to provide connectivity to a remote network 118 to network gateway 110 and to any device connected to network gateway 110 through local network interface 208. According to an implementation, remote network interface 210 is directly connected to a provider network (not shown) through which remote network 118 is reached. In another implementation remote network interface 210 is connected to an internet access device or provider network access device, such as network access device 114, which is in turn connected to remote network 118.

Figure 3:
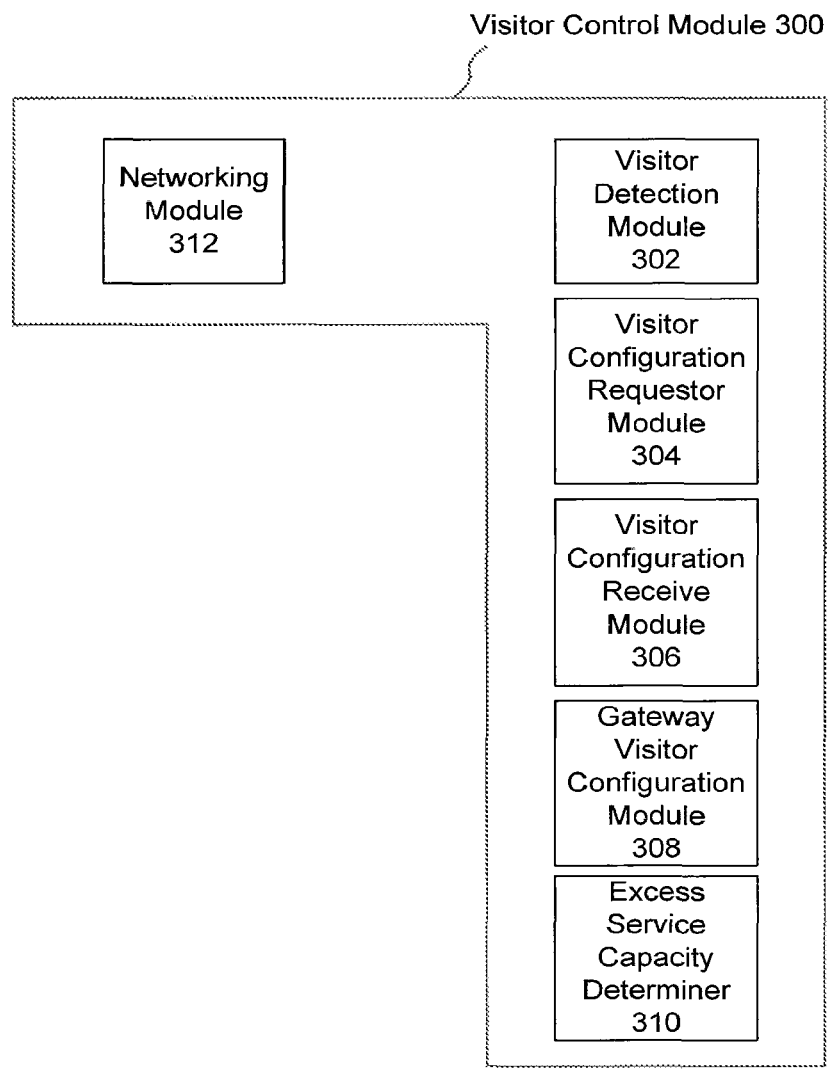
FIG. 3 illustrates a block diagram of a control module that can be implemented in a network device in accordance with an implementation.

FIG. 3 illustrates a visitor control module 300 that can be implemented in network gateway 110 in accordance with an implementation. Visitor control module 300 comprises a visitor detection module 302, a visitor configuration requester module 304, a visitor configuration receiver module 306, and a gateway visitor configuration module 308. Processor 202 of network gateway 110 can, for example, execute visitor control module 300. Implementations, visitor configuration module 300 can be implemented in software, firmware, hardware, or a combination thereof.

Visitor detection module 302 operates to detect the presence of a user nearby the network gateway. Network gateway 110 may detect visitor 102 or visitor client device 104 based upon, for example, detecting visitor 102 or visitor client device 104 over local area network 112, For example, the establishment of a physical layer and/or link layer connection between local network interface 208 and visitor client device 104 may be interpreted as the detection of a nearby user. In WIFI and Bluetooth networks, for example, a connection between nodes is established prior to network layer packets being transmitted. In another implementation, a user may be detected based upon the detection of a new address in the local area network 112. For example, when local area network 112 is an Ethernet, the presence of visitor client device 104 on the Ethernet 112 can be detected based upon the detection of a new physical layer or MAC layer address in that network. According to another implementation, a nearby visitor client device 104 can be detected by network gateway 110 based upon requests for network layer addresses. For example, when network gateway 110 is implementing a dynamic host configuration protocol (DHCP) server (not shown), visitor client device 114 would request an Internet Protocol (IP) address for its use from network gateway 110.

Moreover, visitor detection module 302 can operate to detect a connection by visitor 102 and/or visitor client device 104 to a cloud-based application service 106 through network gateway 110. For example, visitor detection module 302 can monitor communications from visitor client device 104 to a cloud-based service application for which an address has been configured in network gateway 110. Device configurations 214, for example, can include one or more addresses of cloud-based application services for which communications through network gateway 110 can be monitored. According to an implementation, the monitoring may be based upon detecting HTTP protocol messages to the uniform resource locators (URLs) of the servers providing the respective cloud-based service applications.

Visitor detection module 302 can further operate to detect a login and/or other authentication of visitor 102 by cloud-based service application 106. Visitor detection module 302 can detect login events and/or other authentication events by visitor 102 and/or client 104 based on any of several techniques. According to one implementation, the traffic between client 104 and cloud-based server application 106 can be monitored for HTTP authentication requests and HTTP response messages indicating successful authentication. Detection based upon plaintext HTTP is possible, for example, when encryption is not being used for exchanges from the client 104 to cloud-based service application 106, or when a web proxy (not shown) is implemented in network gateway device 110 where the web proxy intercepts the packets from client 104 to cloud-based service application 106. According to other implementation, the setup of a HTTP secure socket layer (SSL) connection or other HTTPS (secure HTTP) may be detected by visitor detection module 302 as a login or other authentication of the visitor by cloud-based service application 106.

In another implementation, visitor detection module 302 may operate to request client 104 for one or more user credentials. For example, upon detection of a connection through network gateway 110 from client 104 to cloud-based service application 106, visitor detection module 302 may request and receive one or more user credentials of visitor 102 from client 104. The request may be implemented, for example, via an HTTP proxy at network gateway 110.

The above described techniques for detecting a connection through network gateway 110 by visitor 102 or client 104, and techniques for detecting login or authentication of visitor 102, are exemplary, and a person skilled in the art would appreciate that other techniques may be used for such detection.

Visitor configuration requester module 304 operates to request configuration for visitor access to network gateway 110 from a cloud-based configuration controller. According to an implementation, visitor configuration requester module 304 determines that network gateway 110 requires configuration to enable access to visitor 102, and creates a configuration request message (not shown) to be sent to cloud-based configuration controller 120. The configuration request message includes information based on which a cloud-based identity provider 108 can find a cloud-based identity of visitor 102. For example, in one implementation, the configuration request message can include one or more user login credentials that visitor 102 provided in order to login to cloud-based service application 106.

According to another implementation, the configuration request message includes an identifier, such as a public IP address (Internet Protocol address) of the network gateway 110, by which cloud-based identity provider 108 and cloud-based service application 106 can relate network gateway 110 to a recent authentication by visitor 102. For example, where network 112 is not a network in which public IP addresses are used, a request for authentication which is originated by visitor client device 104 and received at cloud-base service application 106 will have the public IP address of network gateway 110 as its source IP address. According to an implementation, the source IP address associated with the request for authentication received from visitor client device 104 (i.e. client device associated with visitor 102) can be matched to the public IP address of the network gateway 110 as specified in a configuration request. If a match exists, then the corresponding authentication and user is associated with the network gateway 110, which in turn enables relating a cloud-based identity of the visitor to the ownership of network gateway 110.

According to yet another implementation, network gateway 110 can detect a request for authentication sent by client device 104, and can encapsulate the detected request for authentication in a tunnel such as a SSL tunnel to cloud-based service application 106. One or more of cloud-based social application 130, cloud-based service application 106, cloud-based identity provider 108 or cloud-based configuration controller 120, can then associate the source of the tunnel (network gateway 110) with the request for authentication (originated by visitor 102) encapsulated in the tunnel. A request for configuration for network gateway 110 can be included with the encapsulated request for authentication.

Visitor configuration receiver module 306 operates to receive configuration from a cloud-based configuration controller. According to an implementation, in response to a request from visitor configuration requester module 304, cloud-based configuration controller 120 sends visitor configuration for network gateway 110.

Gateway visitor configuration module 308 operates to configure the network gateway. The configurations received from cloud-based configuration controller 120 are implemented on network gateway 110 by gateway visitor configuration module 308. According to an implementation, as described above, configurations implemented on network gateway 110 include the configuration of the visitor pseudo-anonymous identifier 124 as a visitor to whom access is provided through network gateway 110.

Excess service capacity determiner 310 operates to dynamically determine an unused service capacity, such as excess service capacity estimate 217. Excess service capacity estimate may include an estimated excess bandwidth (also referred to sometimes as "estimated unused bandwidth") that is available with which to provide visitors with network access. Excess bandwidth may be determined as the difference between a maximum available bandwidth of network gateway 110 and the actual bandwidth used by the owner of the network gateway over a predetermined time interval. Alternatively, the difference may be based upon the actual bandwidth used by the owner and any other users authorized by the owner to use the network gateway. Actual bandwidth used may be determined as the maximum or average of the bandwidth used over the relevant time period. The maximum available bandwidth can be determined based upon configuration and/or dynamic measurement. Dynamic measurement may include considering, for example, the maximum bandwidth made available to the network gateway by a corresponding ISP.

Network module 312 operates to provide network capabilities to network gateway 110. Network capabilities can include, but are not limited to, implementing network interfaces such as an interface to home network 112 and an interface to network 116 to link to an external network. Network capabilities can further include address assignment such as a DHCP server, SSL or other tunnel encoding/decoding, network address translation, and the like.

Figure 4:
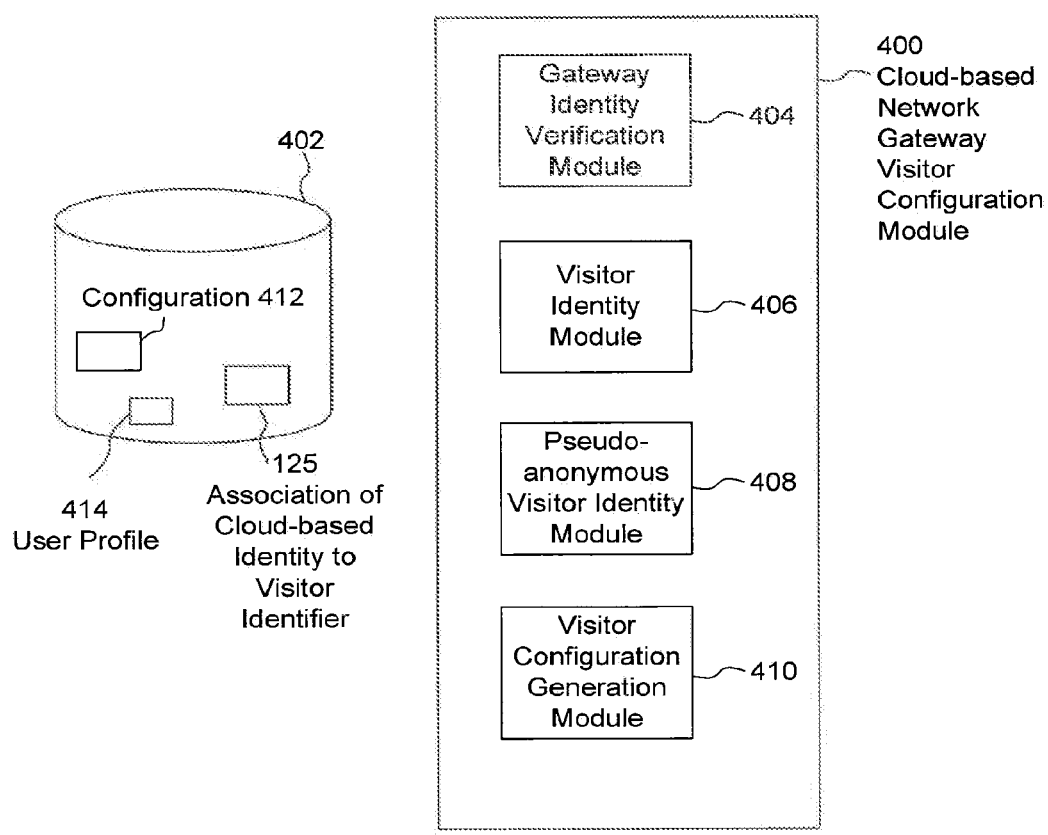
FIG. 4 illustrates a flowchart of a cloud-based configuration controller in accordance with an implementation.

FIG. 4 illustrates a cloud-based network gateway visitor configuration module 400 in accordance with an implementation. Module 400 can be implemented, for example, in cloud-based configuration controller 120 in order to provide visitor configuration to network devices such as network device 110. According to another implementation, module 400 is implemented in a combination of two or more of cloud-based configuration controller 120, cloud-based identity provider 108, and cloud-based service application 106. Module 400 includes a configuration database 402, a gateway identity verification module 404, a visitor identity module 406, a pseudo-anonymous visitor identity module 408, and a visitor configuration generation module 410.

Configuration database 402 comprises stored information including configuration information 412 for network gateway such as network gateway 110. Configuration information 412 may include a configuration profile and/or configuration instructions for configuring network gateway 110. Configuration database 402 also includes user associations, such as visitor associations 125, that define a binding between a visitor's cloud-based identity and a visitor identity with which one or more network gateways 110 have been configured.

Gateway identity verification module 404 operates to determine the identity of the network gateway 110 that is to be configured. Network gateway 110 can be uniquely identified by its IP address such as the public IP address used to represent it to remote networks. When a configuration request associating visitor 102 or visitor client device 104 with network device 110 is received at cloud-based configuration controller 120, gateway identity verification module 404 may operate to verify that the visitor and/or client are actually associated with the network device. According to an implementation, verification can be based upon comparing the source address in the configuration request with the source address used by client 104 in authenticating with a cloud-based service application 106.

Visitor identity module 406 operates to determine a cloud-based identity for a visitor, such as visitor 102, for whom the access privileges of network gateway 110 are to be configured. According to an implementation, visitor identity module 406 determines a visitor's cloud-based identity based upon one or more credentials of the visitor which are obtained by network gateway 110. According to another implementation, the visitor's cloud-based identity is determined using information that only indirectly relates to the visitor. For example, visitor identity module 406 may use the public IP address of a network gateway to determine, through a cloud-based service application 106 and/or cloud-based identity provider 108, a cloud-based identity of user 102 who accesses cloud-based service application 106 from the same public IP address.

Pseudo-anonymous visitor identity module 408 operates to create and manage a visitor identity which is to be configured in network gateway 110. The visitor identity is the identity of the visitor as known to, and/or as stored on, network gateway 110. According to an implementation, the visitor identity is pseudo-anonymous, wherein there is no information in the visitor identity using which the actual identity of the visitor can be determined. According to an implementation, the cloud-based identity of a visitor is related to a visitor identity only through a visitor association 125. Visitor association 125 may be stored in the cloud, for example, in cloud-based configuration controller 120, and may or may not be stored in the network gateway 110.

Visitor configuration generation module 410 operates to generate the configuration that is to be implemented in network gateway 110. According to implementation, the generated configuration is based upon characteristics of network gateway 110, preferences of owner 101, and any preconfigured public information 414 of visitor 102. User profile information 414 may be obtained and stored by cloud-based configuration module 120 and respective cloud-based identifiers can be associated with the stored preferences 414. The preconfigured preferences 414 may include such configurations as the levels of service to be offered to visitors based on respective relationship categories to which they belong. These preferences may also be referred to as configuration profiles. In some implementations, the generated configuration for the visitor may be based also upon any requests and/or preferences of the visitor. For example, a visitor may request an unsecured wireless connection, or a particular level of bandwidth.

The various logic modules illustrated in FIGS. 1-4 can be implemented in software, firmware, hardware, or a combination thereof. In an implementation, one or more of the modules are implemented in the C++, C, and Java programming languages. In one implementation, a computer program product may have logic including the computer program logic of the modules recorded on a computer readable medium such as a hard disk, flash disk, or other form of storage medium. According to an implementation, the modules implemented in software execute on processor 202 and utilize volatile memory 204 for temporary storage of data and instructions. Persistent memory 206 may be used for additional temporary storage during the execution of the modules.

Figure 5:
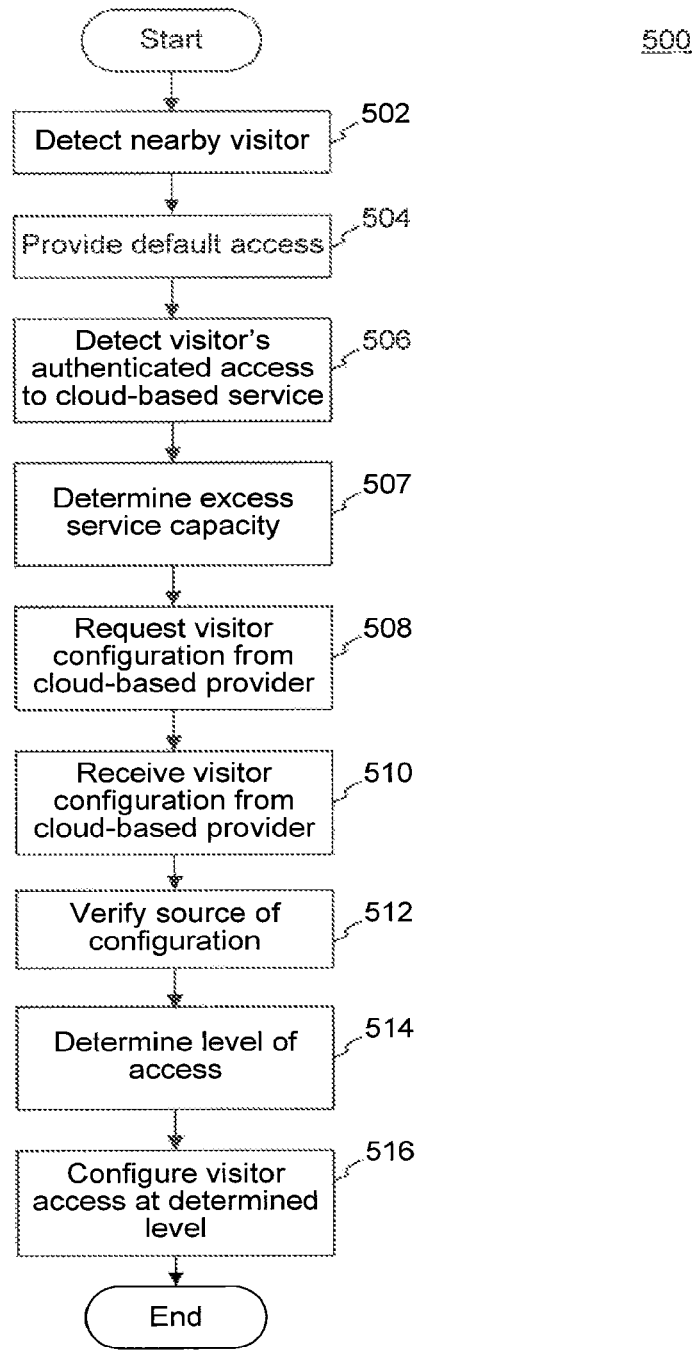
FIG. 5 illustrates a flowchart of a method of configuring a network device for visitor access in accordance with an implementation.

FIG. 5 illustrates a method 500 (steps 502-516) for controlling a network gateway to provide access to a visitor in accordance with an implementation. Method 500 may not occur in the order shown, or require all of the steps. Method 500 can be performed, for example, in network gateway 110 by visitor control module 300. Method 500 can be used to automatically associate a nearby visitor with the owner's ISP or other service provider based upon a cloud-based identity of the visitor and to accordingly provide access for the visitor to various network resources through the network gateway.

In step 502, a nearby visitor is detected. According to an implementation, a client device 104 is detected as being connected to a local network 114 of network gateway 110. Client device 104 may be detected on the basis of its detection by network gateway 110 as a nearby device with a Bluetooth interface. Client device 104 may also be detected when it forms a link layer association with a WIFI access point in network gateway 110. Yet another method of detecting a nearby visitor can be based upon the packets or frames that are detected on a local wired network. Another method for detecting a nearby visitor client device 104 at a network gateway 110 can be based upon an address allocator (e.g. DHCP server) for local network 114 being located in gateway 110.

After detecting the visitor, method 500 proceeds to step 504 in which access to the internet is provided to the visitor based upon a default profile. The default profile includes configuration settings that provide at least a basic level of access to the internet for an as yet unauthorized user. According to an implementation, the default profile is configured to allow a nearby user who is as yet unauthorized to access to any of one or more specified cloud-based service applications 106.

In step 506, an access by the visitor to a cloud-based service application is detected. The network gateway can monitor packets and/or connections that are forwarded through it to detect traffic (e.g., packets and/or connections) that are to a destination IP address or to a destination URL that is listed in a preconfigured list of destinations. Therefore, the traffic through the network gateway can be monitored for packets exchanged between a nearby user or the client through which the nearby visitor is connected to the local network and a remote destination which is listed in a preconfigured list. According to an implementation, upon initial connection to the network gateway 110, client device 104 may be displayed a graphic interface which prompts the user to proceed to login to any of a group of cloud-based service applications.

The network gateway may detect a login or other authentication of the visitor by a cloud-based service application to which the visitor connects through the network gateway. An authentication of the visitor may be detected based upon detected message exchanges, such as HTTP authentication required and response messages. According to another implementation, the setting up of a SSL connection from the client of the visitor to a selected destination is considered an authentication of the visitor. According to yet another implementation, a proxy server may be implemented to the network gateway. The proxy server would intercept messages between the user and the cloud-based service application, and perform any changes required for addressing etc. The proxy server may be used in detecting authentication requests and responses.

In step 507, the network gateway may determine an estimated excess service capacity available at the network gateway. According to an implementation, the excess service capacity includes an estimated excess bandwidth. The excess bandwidth available may be determined as the difference between a maximum bandwidth available for network access through the network gateway and the actual bandwidth used during a predetermined time interval. The actual bandwidth used may be determined based upon the owner's use of the network gateway, or the use by the owner and any other users authorized by the owner. An average or maximum value of the actual bandwidth may be considered over the predetermined time interval. The maximum bandwidth available to the network gateway can be based upon a configured value or a dynamically determined value. A maximum available bandwidth of the network gateway can be dynamically determined, for example, based upon a bandwidth level made available by the ISP to the network gateway. The excess bandwidth estimated in this step is intended to limit the amount of bandwidth provided to any visitor through the network gateway, so as not to interfere with the services provided by the network gateway to the owner and users authorized by the owner.

In step 508, the network gateway requests visitor configuration from a cloud-based configuration controller. The request comprises an identification of the network gateway and an indication of the visitor for whom access to the network gateway is to be granted. The identification of the network gateway may include a public IP address of the network gateway. The identification of the network gateway may also include an identifier such as the serial number.

The indication of the visitor may include information that can be used by a cloud-based entity to directly or indirectly relate the user to a cloud-based identity. Example indications of the visitor can include one or more user credentials such as a username and/or password, or a public key (e.g., public PKI key) of the visitor.

According to some implementations, the indication of the visitor may be some information that indirectly relates to the visitor. For example, the public IP address of the network gateway can be considered an indication of the visitor who has connected to a cloud-based service application through network gateway. The information included in the configuration request can be used by cloud-based configuration controller and other cloud-based services to associate an authenticated visitor with the network gateway by establishing that the network gateway is an intermediary in the trusted path between the user and an authenticated cloud-based service. The request may include information with regard to the estimated excess bandwidth that may be available for visitor access.

In step 510, in response to its visitor configuration request, the network gateway receives visitor configuration from the cloud-based configuration controller. The received visitor configuration may be in the form of one or more instructions to be executed in the network gateway, or in the form of a binary executable that can be loaded in the network gateway. The received configuration includes ownership configuration for the network gateway. The received configuration can also include configurations for other configuration parameters. Exemplary configuration parameters include status and operational parameters of respective network interfaces. Configuration may also include a maximum bandwidth to be made available to the visitor. For example, such a maximum bandwidth configuration for the visitor may be based upon the estimated bandwidth determined by the network gateway. The configuration may be received over a secure communications path established between the cloud-based configuration controller and the network gateway. For example, a secure communications path may be established by the configuration controller encrypting the configuration using the public key of the network gateway, and the network gateway decrypting the encrypted configuration using its private key which is configured in the device at the time of manufacture.

Optionally, in step 512, the source of the received visitor configuration is compared to the source of previously received owner configuration. The source of the configuration may be determined as the location at which the configuration was originated. According to an implementation, the source of the visitor configuration can be cloud-based configuration controller 120. Based upon the comparison, if the source of the visitor configuration is found to be the same as the source of the ownership configuration which was received previously, then the source of the visitor configuration is successfully verified and the received visitor configuration may be implemented.

In step 514, a level of service to be provided to the visitor is determined. The level of service may be determined based upon the received configuration from cloud-based configuration controller. According to another implementation, the level of service to be provided to the visitor may be determined based upon the configuration received from the cloud-based configuration controller, and dynamic conditions at the network gateway. For example, the dynamic conditions at the network gateway can include changes in the amount of available bandwidth or changes to the estimated excess bandwidth.

In step 516, one or more visitor configuration parameters in the network gateway are configured in order to provide the visitor with a second level of network access. The one or more visitor configuration parameters are configured to give effect to the visitor configuration specified in the configuration received from the cloud-based configuration controller. According to an implementation, the visitor configuration parameters in the network gateway can be set to a pseudo-anonymous visitor identifier that is specified by the cloud-based configuration controller. According to an implementation, no information that can directly identify the visitor is provided from the cloud-based configuration controller to network gateway. The association between the visitor identifier and the visitor's cloud-based identity is maintained at the cloud-based configuration controller and not sent or downloaded to the network gateway.

Visitor configurations can include associating one or more MAC addresses, for example, the MAC address of client device 104 used by visitor 102, for which access is enabled and one or more rules in the firewall and/or access control list in network gateway 110 is configured. The rules in the firewall and/or an access control list may specify, for example, for the MAC addresses associated with visitor 102, what networks or network locations are accessible, what network locations are specifically prevented from access, a maximum quality of service (e.g., bandwidth) to be offered, whether logging or monitoring is enabled, what local network resources are accessible, whether periodic authentication of the user is required, and whether multiple users are allowed from the same MAC address. Configurations may also specify whether the visitor should access the network gateway through an encrypted connection and if so how the encrypted connection is to be established. For example, according to an implementation, if an encrypted connection is to be established, a copy of a shared encryption key for accessing home network 112 or network gateway 110 using an encrypted connection may be transferred from network gateway 110 to client device 104 using a message including the shared key, where the message is encrypted using the public key of the client device 104. The client device 104 can recover the shared key from the message by decrypting the message using the corresponding private key, and use the shared key to encrypt its communications through network gateway 110.

Figure 6:
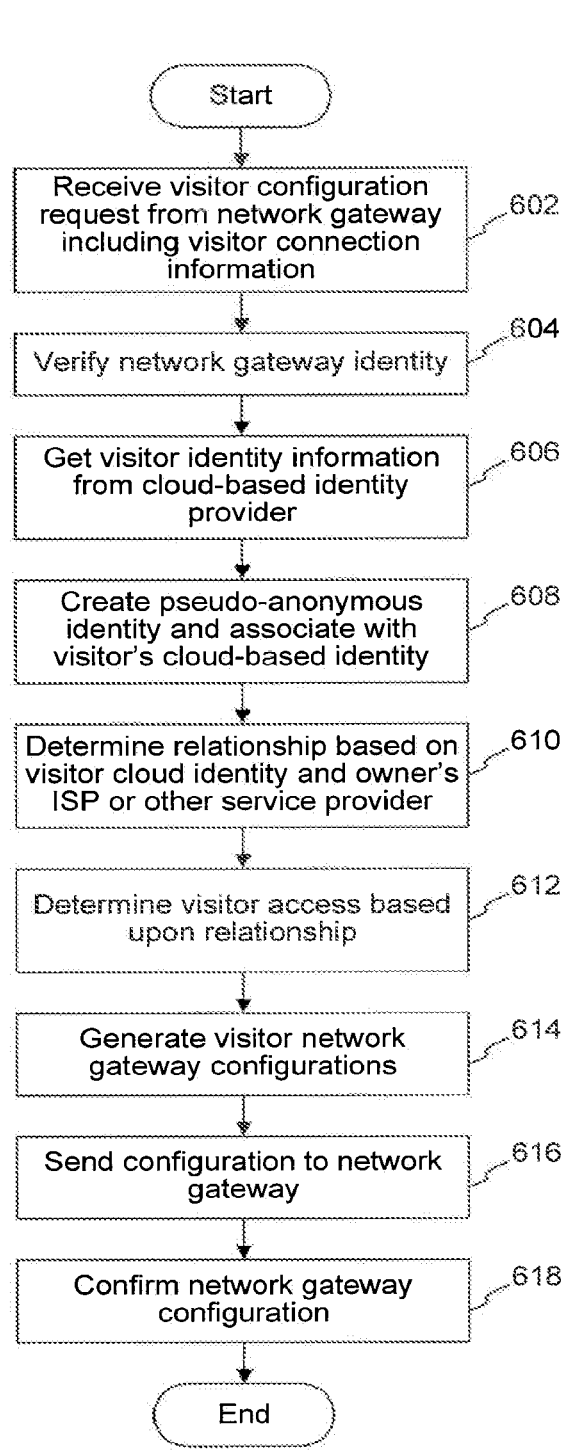
FIG. 6 illustrates a flowchart of a method of providing cloud-based control of visitor access in a network device in accordance with an implementation.

FIG. 6 illustrates a flowchart of a method 600 (steps 602-618) of providing control of a network gateway in accordance with an implementation. Method 600 may not occur in the order shown, or require all of the steps. Method 600 can be performed by a cloud-based configuration controller 120 to configure and control a network gateway 110 in order to provide network access to a visitor.

In step 602, a visitor configuration request is received from the network gateway requesting configuration. As described above, the configuration request includes an identification of the network gateway, for example, in the form of a public IP address. The identification of the network gateway can also include other information such as the serial number of the network gateway and/or the type of network gateway.

The configuration request also includes an indication of a visitor who is detected to be nearby the network gateway. The nearby visitor can be a user who is connected to the network gateway through one of the gateway's local network interfaces. The nearby visitor may be selected by the network gateway based on a communication between the nearby visitor (or a client through which the nearby visitor is connected to the network gateway) and a cloud-based service application via the network gateway. For example, the nearby visitor may be a user who uses network gateway 110 to access a cloud-based service application 106. Before associating any identifying information with the visitor, an option may be provided for the visitor to choose not participating in the disclosed hotspot access.

In step 604, the identity of the network gateway may be verified. The verification can be based upon checking that any IP address provided as the IP address of the network gateway is reachable and not in a disallowed list. If a serial number of the network gateway is provided, the verification can also include checks to ensure that the serial number is valid. Similar checks can be performed to ensure that the type of the network gateway is supported by the cloud-based configuration controller.

In step 606, the cloud-based visitor identity corresponding to the visitor information provided in the configuration request is determined. How the cloud-based visitor identity is determined can differ based upon the indication of the nearby visitor that is included in the configuration request. The cloud-based configuration controller uses one or more of the indications of the visitor provided in the configuration request to determine a cloud-based identity associated with the visitor.

If one or more user credentials of the visitor, such as login username, is provided in the configuration request, the cloud-based configuration controller uses the provided one or more credentials to query a cloud-based service application and/or cloud-based identity provider can check that an authentication was made for the credentials. In some implementations, the cloud-based service application and/or cloud-based identity provider can also check that the authentication was made for the credentials arriving from a particular IP address (e.g., the public IP address of the network gateway, which may be the source of the request to authenticate).

If the configuration request does not include a credential of the visitor, then an indirect indication of the visitor is used by the configuration controller to query the cloud-based service application and/or cloud-based identity provider in order to obtain a cloud-based identity. For example, when queried with an IP address of the network gateway (e.g., public IP address of the network gateway), the cloud-based service application and/or cloud-based identity provider can be configured to determine the authentications performed based on request from that IP address. The most recent of authentications provided for in response to a request from that IP address can be considered to be associated with the visitor located nearby the network gateway. Thus, the cloud-based service application and/or cloud-based identity provider can return the cloud-based identity based upon an indirect indication of the user such as the public IP address of the network gateway.

In step 608, a visitor identifier for the network device is generated. In another implementation, the visitor identifier may be provided by the network gateway, for example, by including it in the configuration request. In some implementations, the visitor identifier is a pseudo-anonymous identifier. When generated as a pseudo-anonymous identifier, there is nothing in the visitor identifier with which the visitor can be directly identified. For example, the visitor identifier may be a randomly generated number.

In step 610, a relationship between the visitor and the owner's ISP is determined. The relationship can be determined between the visitor's cloud-based identity and the ISP. According to an implementation, the visitor can have a direct relationship with the ISP as a customer of the ISP. For example, visitor 102 may be a customer of ISP 130 which is also the ISP of owner 101. According to another implementation, the visitor can have an indirect relationship with the ISP as a customer of another ISP with which the owner's ISP has a business relationship. For example, visitor 102 may be a customer of other ISP 134 with which the owner's ISP 130 has a business agreement to provide network access to each other's customers. Each ISP may maintain a database 131 of its customers.

In step 612, the level of access to be allowed to the visitor is determined. According to an implementation, the allowed access is determined based upon the relationship between the visitor and the owner's ISP. The access determination may involve a determination as to what network resources are permitted to be accessed by the visitor, whether the visitor can access the internet without restrictions, whether the visitor can access one or more virtual private networks, a level of quality of service to be allowed to the user, and the like. The request received from the network gateway may include an estimated excess bandwidth as a maximum bandwidth to be provided to the visitor. According to an implementation, different levels of service may be provided to visitors based on whether the visitor has a direct or indirect relationship with the owner's ISP. According to another implementation, the service levels may differ based upon a subscription level of the respective customer. Each visitor may have a profile describing a desired level of service (e.g., subscribed ISP services) and other parameters stored at the visitor's ISP. For example, a visitor 102 who is a customer of ISP 130 has a profile 132 stored at ISP 130. If visitor 102 is a customer of other ISP 134, then the profile 132 of visitor 102 can be stored at other ISP 134.

Preconfigured configuration profiles may specify levels of access and quality of service for various relationship categories between the visitor and the owner's ISP. For example, customers of the owner's ISP may be assigned a level of access in which they can connect to the internet without restriction to specific locations, and visitors who are only indirectly related to the owner's ISP may be allowed only to specific locations on the internet. Other configurations, such as privileges to upload and/or download files, use streaming multimedia content, and the like may also be configured for visitor based upon their relationship with the owner's ISP. The configurations may be specified at the level of the individual visitor and/or relationship category. According to an implementation, when a relationship between the visitor and the owner of the network gateway is identified, the network gateway may be configured to provide the visitor with a level of access according to a predetermined profile corresponding to the identified relationship category. The owner may then further configure the access provided to the visitor in order to provide more or less access privileges and/or quality of service to that visitor.

In step 614, one or more instructions are formed to configure access to visitors in the network gateway. The configuration may comprise providing access to the MAC address associated with the visitor, such as, the MAC address of visitor client device 104 associated with visitor 102. The configuration may further comprise one or more firewall rules and/or other access control rules associating the MAC address of visitor client device 104 with selected features, access privileges, and/or access restrictions. Configurations for a visitor may include a maximum level of bandwidth to the user or MAC address associated with the visitor, whether the specified maximum level of bandwidth is to be enforced at all times or only at times when there is no excess bandwidth in the network gateway, a minimum level of bandwidth to be provided, whether to enable logging or monitoring of the MAC addresses associated with the visitor, whether to require periodic user authentication, whether multiple users or multiple source IP addresses are allowed from the same MAC address associated with the visitor, networks or network locations to which access is allowed, networks or network locations to which access is disallowed, access to local network resources, and the like.

In step 616, the cloud-based configuration controller transmits the one or more configuration instructions to the network gateway in order to cause the network gateway to reconfigure itself based upon the transmitted one or more configuration instructions. The transmission of the configuration instructions and/or profile may be encrypted and/or in a secure tunnel formed by the network gateway and the configuration controller. The encryption and/or the secure tunnel can be implemented using one of many techniques. According to an implementation, the cloud-based configuration controller encrypts the configuration being sent to the network gateway. The encryption may be based on a preconfigured key or a public key associated with the network gateway device.

In step 618, the network gateway configuration can be confirmed by the cloud-based configuration controller. For example, a message may be received from the network gateway indicating the configuration status. If the configuration is successful method 600 ends. If the configuration is unsuccessful, the configuration controller may optionally retry the transmission of the configuration instructions.

Figure 7:
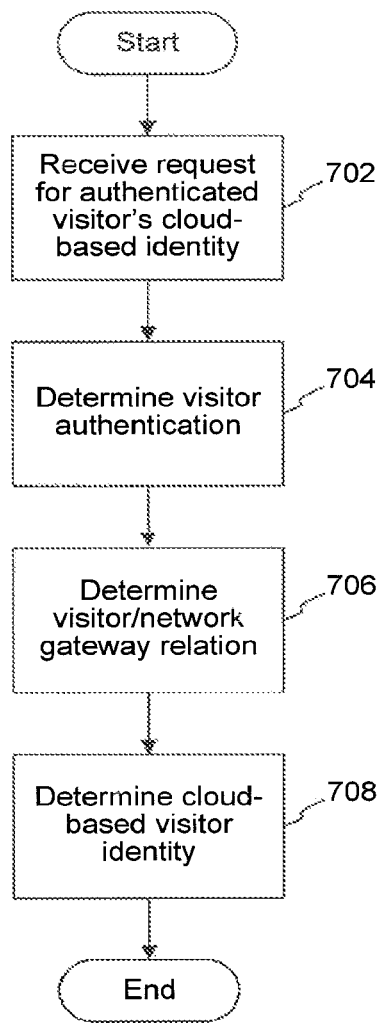
FIG. 7 illustrates a flowchart of a method of determining an authenticated cloud-based identity for a user in accordance with an implementation.

FIG. 7 illustrates a flowchart of a method 700 (steps 702-708) of determining an authenticated cloud-based identity for a visitor in accordance with an implementation. Method 700 may not occur in the order shown, or require all of the steps. According to an implementation, method 700 can be implemented by one or more of cloud-based service application 106, cloud-based identity provider 108 and cloud-based configuration controller 120 illustrated in FIG. 1.

In step 702, a request for an authenticated cloud-based identity of a visitor is received. According to an implementation, cloud-based configuration controller 120, upon receiving a configuration request from network gateway 110, requests for an authenticated cloud-based identity of a visitor from a cloud-based service application 106 or cloud-based identity provider 108. According to another implementation, the network gateway can make the request for the visitor's authenticated cloud-based identity from one or more of cloud-based service application 106, cloud-based identity provider 108 and cloud-based configuration controller 120. The request may include a credential of the visitor such as a user name.

In step 704, an authentication of the visitor is determined. According to an implementation, one or more credentials of the visitor (e.g., username, password, public key, and shared key) or other indicator of the visitor such as an IP address from which the visitor would have logged in, is used to locate a previously performed authentication of the visitor. The aught of the visitor, for example, may have occurred when the visitor accessed a cloud-based service application.

In step 706, it is determined whether the network gateway (i.e. the network gateway that is to be configured) is an intermediary between the visitor and the cloud-based service for which authentication was sought. The intermediary relationship between the visitor and the network gateway can be determined based upon detecting that the public IP address of the network gateway is the same as the public IP address from which the authentication of the user was requested.

In step 708, the cloud-based identifier of the visitor is determined. The determined cloud-based identity is found based upon a detected successful authentication of the visitor. The determined cloud-based identity is found based upon a detected successful authentication of the visitor. The determined cloud-based identity of the visitor is considered an authenticated cloud-based identity because, for example, it is found based upon a detected authentication of the visitor.

The implementations have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific implementations will so fully reveal the general nature of the invention that others can, by applying knowledge within the skill of the art, readily modify and/or adapt for various applications such specific implementations, without undue experimentation, without departing from the general concept of the present invention. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described illustrative implementations, but should be defined only in accordance with the following claims and their equivalents.

The invention claimed is:

1. A method of configuring a wireless local area network gateway, comprising:
   providing to a nearby client device of a user a first level of access through the wireless local area network gateway to access a cloud-based service provider in a remote network, wherein the nearby client device of the user is communicatively coupled to the wireless local area network gateway through a local network interface of the wireless local area network gateway;
   determining, by one or more processors, if a source Internet Protocol (IP) address associated with a request for authentication received from the nearby client device is matched to a public IP address of the wireless local area network gateway; and
   if the source IP address matches the public IP address:
      receiving, from a cloud-based configuration provider, a configuration setting associated with the nearby client device of the user; and
      reconfiguring, by the one or more processors, the wireless local area network gateway in accordance with the received configuration setting to provide a second level of access to the nearby client device of the user, the reconfiguring comprising:
         determining a current excess bandwidth of the wireless local area network gateway; and
         reconfiguring the wireless local area network gateway to provide a maximum bandwidth to the nearby client device of the user, wherein the maximum bandwidth does not exceed the determined current excess bandwidth.

2. The method of claim 1, further comprising:
   detecting an access by the nearby client device of the user to the cloud-based service provider through the wireless local area network gateway; and
   responsive to the detection, requesting a configuration for the nearby client device of the user from the cloud-based configuration provider, wherein the request for authentication is encapsulated in a tunnel and the configuration request is associated with the encapsulated request for authentication.

3. The method of claim 1, further comprising determining the second level of access in accordance with the received configuration setting.

4. The method of claim 1, wherein the reconfiguring the wireless local area network gateway includes at least one of:
   configuring one or more first rules in the wireless local area network gateway to enable access by the nearby client device of the user to one or more selected first internet locations; or
   configuring one or more second rules in the wireless local area network gateway to disable access by the nearby client device of the user to one or more selected second internet locations.

5. The method of claim 1, wherein the reconfiguring the wireless local area network gateway includes at least one of:
   configuring one or more first rules in the wireless local area network gateway to enable access by the nearby client device of the user to one or more selected first ports; or
   configuring one or more second rules in the wireless local area network gateway to disable access for the nearby client device of the user to one or more selected second ports.

6. The method of claim 1, wherein the current excess bandwidth is based upon a bandwidth utilization by the owner of the user account on the wireless local area network gateway over a preceding time interval.

7. The method of claim 6, wherein the current excess bandwidth is further based upon a bandwidth utilization by one or more users who have been previously authorized to use the wireless local area network gateway based upon a relationship with the owner of the user account on the wireless local area network gateway.

8. The method of claim 1, wherein reconfiguring the wireless local area network gateway in accordance with the received configuration setting comprises:
   determining an estimated unused service capacity of the wireless local area network gateway based upon a use of the wireless local area network gateway over a preceding time interval; and
   reconfiguring the wireless local area network gateway to provide the second level of service to the nearby client device of the user such that the nearby client device of the user does not exceed the determined estimated unused service capacity.

9. The method of claim 1, wherein the first level of access is based upon a default configuration, and wherein the second level of access is configured specifically for the nearby client device of the user.

10. The method of claim 1, wherein the reconfiguring the wireless local area network gateway is performed using a pseudo-anonymous identifier to represent the nearby client device of the user.

11. The method of claim 1, wherein an initial configuration of the second level of access is based on a predetermined profile corresponding to a relationship category of the user.

12. The method of claim 1, wherein a nearby client device of the user is subscribed to a capability to have wireless access through wireless local area network gateways owned by one of customers of a first network service provider of the nearby client device of the user or customers of one or more second network service providers other than the first network service provider of the nearby client device of the user, the nearby client device of the user being authorized by one of the first and second network service providers and not an owner of the user account on the wireless local area network gateway.

13. The method of claim 1, further comprising:
   comparing a source of the received configuration setting to a source of a previously received ownership configuration setting; and
   wherein the reconfiguring is performed only if the source of the received configuration setting and the source of the previously received ownership configuration setting are the same.

14. A wireless local area network gateway comprising:
   one or more processors;
   a downlink network interface communicatively coupled to the one or more processors and configured to access a home network;
   an uplink network interface communicatively coupled to the one or more processors and configured to directly or indirectly access a remote network; and
   a non-transitory machine-readable medium comprising instructions stored therein, which when executed by the one or more processors cause the wireless local area network gateway to perform operations comprising:
      detecting an access by a client device of a visitor through the wireless local area network gateway to a cloud-based service;
      receiving a configuration setting associated with the visitor from a cloud-based configuration provider;
      determining if a source Internet Protocol (IP) address associated with a request for authentication received from the client device of the visitor is matched to a public IP address of the wireless local area network gateway;
      if the source IP address matches the public IP address, associating the configuration setting with the visitor; and
      configuring the wireless local area network gateway in accordance with the received configuration setting to provide a second level of access to the client device of the visitor, the configuring comprising:
         determining an estimated unused service capacity of the wireless local area network gateway based upon a use of the wireless local area network gateway over a preceding time interval; and
         configuring the wireless local area network gateway to provide the second level of service to the nearby client device of the user such that the nearby client device of the user does not exceed the determined estimated unused service capacity.

15. The wireless local area network gateway of claim 14, further performing operations comprising:
   requesting the configuration setting associated with the visitor from the cloud-based configuration provider, wherein the request for authentication is encapsulated in a tunnel and the configuration request is associated with the encapsulated request for authentication.

16. The wireless local area network gateway of claim 14, wherein the configuring the wireless local area network gateway to provide a second level of access includes at least one of:
   configuring one or more first rules in the wireless local area network gateway to enable access by the visitor to one or more selected first internet locations or to one or more selected first ports; or
   configuring one or more second rules in the wireless local area network gateway to disable access by the visitor to one or more selected second internet locations or to one or more selected second ports.

17. The wireless local area network gateway of claim 14, wherein the configuring the wireless local area network gateway to provide a second level of access comprises:
   determining a current excess bandwidth of the wireless local area network gateway; and
   reconfiguring the wireless local area network gateway to provide a maximum bandwidth to the visitor, wherein the maximum bandwidth does not exceed the determined current excess bandwidth.

18. A non-transitory machine-readable medium comprising instructions stored therein, which when executed by a wireless local area network gateway, cause the wireless local area network gateway to perform operations comprising:
   providing to a nearby client device of a user a first level of access through the wireless local area network gateway to access a cloud-based service provider in a remote network, wherein the nearby client device of the user is communicatively coupled to the wireless local area network gateway through a local network interface of the wireless local area network gateway;
   determining, by one or more processors, if a source Internet Protocol (IP) address associated with a request for authentication received from the nearby client device is matched to a public IP address of the wireless local area network gateway; and if the source IP address matches the public IP address:

receiving, from a cloud-based configuration provider, a configuration setting associated with the nearby client device of the user; and reconfiguring, by one or more processors, the wireless local area network gateway in accordance with the received configuration setting to provide a second level of access to the nearby client device of the user, the reconfiguring comprising:

determining an estimated unused service capacity of the wireless local area network gateway based upon a use of the wireless local area network gateway over a preceding time interval; and reconfiguring the wireless local area network gateway to provide the second level of service to the nearby client device of the user such that the nearby client device of the user does not exceed the determined estimated unused service capacity.

19. The non-transitory machine-readable medium of claim 18, the operations further comprising:

detecting an access by the nearby user to the cloud-based service provider through the wireless local area network gateway; and responsive to the detection, requesting a configuration for the nearby user from the cloud-based configuration provider, wherein the request for authentication is encapsulated in a tunnel and the configuration request is associated with the encapsulated request for authentication.

\* \* \* \* \*